(12) United States Patent
Jun et al.

(10) Patent No.: US 10,180,700 B2
(45) Date of Patent: Jan. 15, 2019

(54) DISPLAY DEVICE

(71) Applicant: LG Display Co., Ltd., Seoul (KR)

(72) Inventors: Sahng Ik Jun, Seoul (KR); Hong Man Moon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 392 days.

(21) Appl. No.: 14/321,445

(22) Filed: Jul. 1, 2014

(65) Prior Publication Data

US 2015/0002936 A1 Jan. 1, 2015

Related U.S. Application Data

(60) Provisional application No. 61/841,858, filed on Jul. 1, 2013.

(30) Foreign Application Priority Data

May 8, 2014 (KR) ........................ 10-2014-0055034

(51) Int. Cl.
| | |
|---|---|
| *G06F 1/16* | (2006.01) |
| *G02B 1/11* | (2015.01) |
| *G02F 1/1335* | (2006.01) |
| *G02B 1/116* | (2015.01) |
| *G02B 5/30* | (2006.01) |

(52) U.S. Cl.
CPC ............ *G06F 1/1603* (2013.01); *G02B 1/116* (2013.01); *G02F 1/133512* (2013.01)

(58) Field of Classification Search
CPC ....... G06F 1/1603; G02B 5/3025; G02B 1/11; G02B 1/115; G02B 1/116; G02F 2001/1635; G02F 1/1343; G02F 1/1335; G02F 1/133509; G02F 1/133512; G02F 1/136209; G02F 2001/136222; H01L 27/3272; H01L 29/7869
See application file for complete search history.

(56) References Cited

U.S. PATENT DOCUMENTS

| | | | |
|---|---|---|---|
| 8,692,258 B2* | 4/2014 | Kim | .................... H01L 27/1259 257/72 |
| 2005/0077826 A1* | 4/2005 | Watanabe | ................. B32B 7/02 313/587 |
| 2006/0001814 A1* | 1/2006 | Paik | .................. G02F 1/136209 349/141 |
| 2010/0157224 A1* | 6/2010 | Kim | .................. G02F 1/134363 349/137 |
| 2011/0019144 A1* | 1/2011 | Koh | .................. G02F 1/134363 349/143 |

(Continued)

*Primary Examiner* — William R Alexander
*Assistant Examiner* — Ephrem Z Mebrahtu
(74) *Attorney, Agent, or Firm* — Fenwick & West LLP

(57) ABSTRACT

Disclosed is a display device. The display device includes a display panel, which includes a display area and a non-display area surrounding the display area, and a panel driver connected to the display panel in the non-display area of the display panel. The display panel includes an outer substrate configured to include a gate line and a data line that intersect with each other, an inner substrate coupled to a bottom of the outer substrate, and a reflection reduction member formed on the outer substrate to overlap at least one selected from the gate line and the data line, and configured to reduce a reflectivity of external light by a line.

19 Claims, 12 Drawing Sheets

(56) References Cited

U.S. PATENT DOCUMENTS

| | | | | |
|---|---|---|---|---|
| 2011/0102719 A1* | 5/2011 | Kakehi | ............ | G02F 1/134363 349/122 |
| 2011/0157507 A1* | 6/2011 | Koh | .................... | G02F 1/13439 349/43 |
| 2012/0281383 A1* | 11/2012 | Hwang | ............. | G02F 1/133308 361/807 |
| 2014/0085556 A1* | 3/2014 | Yin | ..................... | G02F 1/1362 349/43 |
| 2014/0240926 A1* | 8/2014 | Choi | .................. | H04M 1/0266 361/707 |
| 2014/0319528 A1* | 10/2014 | Kesho | ................ | H01L 27/3223 257/59 |
| 2014/0368772 A1* | 12/2014 | Hwang | ............. | G02F 1/133502 349/106 |
| 2015/0091004 A1* | 4/2015 | Kim | .................... | H01L 27/1214 257/43 |
| 2015/0323843 A1* | 11/2015 | Park | .................... | G02F 1/13439 362/607 |
| 2016/0291366 A1* | 10/2016 | Hara | .................... | G02F 1/1345 |

* cited by examiner

DISPLAY DEVICE

CROSS-REFERENCE TO RELATED APPLICATIONS

This application claims the benefit of U.S. Provisional Application No. 61/841,858, filed on Jul. 1, 2013, and Korean Patent Application No. 10-2014-0055034, filed on May 8, 2014, which are hereby incorporated by reference as if fully set forth herein.

BACKGROUND

Field of the Invention

The present invention relates to a display device, and more particularly, to a display device with a minimized thickness and an enhanced aesthetic appearance.

Discussion of the Related Art

As society advances to the information-oriented society, display devices that display a massive amount of information are rapidly advancing. In particular, liquid crystal display (LCD) devices or organic light emitting display devices (which are flat panel display devices having excellent performance in terms of thinning, lightening, and low power consumption) are being practically applied.

In the LCD devices, active matrix LCD devices include an array substrate including a thin film transistor (TFT) that is a switching element for adjusting turn-on/off of a voltage for each pixel, and have an excellent ability to realize a resolution and a moving image. Therefore, the active matrix LCD devices are attracting much attention.

Moreover, the organic light emitting display devices are self-emitting devices that has a characteristic in which luminance is high and an operating voltage is low, and self-emits light. The organic light emitting display devices have a high contrast ratio (C/R), a thin thickness, low-temperature stability, and a low driving voltage, and have a response time of microsecond (µs), thereby easily displaying a moving image. Also, a driving circuit for the organic light emitting display devices is easily manufactured and designed. Therefore, the organic light emitting display devices are attracting much attention as flat panel display devices.

Various remedies are being needed in order for display devices to appeal to more consumers. Particularly, a thickness of a display device is minimized, and research is increasingly conducted on a design with an enhanced aesthetic appearance that can induce consumers to buy by appealing to the consumers' sense of beauty.

FIG. 1 is a schematic cross-sectional view of a general display device.

As illustrated in FIG. 1, the general display device includes a display panel 10 including a lower substrate 12 and an upper substrate 14, a panel driver 20, and a top case 30.

The lower substrate 12 includes a plurality of gate lines and a plurality of data lines which intersect with each other to define a plurality of pixel areas, a TFT formed in each of the plurality of pixel areas, and a pixel electrode connected to the TFT.

The upper substrate 14 includes a color filter, and is facing-coupled to the lower substrate 12. A portion of the lower substrate 12 is exposed to the outside for applying signals to the gate lines and the data lines which are formed on the lower substrate 12. To this end, a partial area of the lower substrate 12 is not coupled to the upper substrate 14. The panel driver 20 is connected to a pad part formed at an edge of the lower substrate 12 which is not coupled to the upper substrate 14, and transfer the signals to the gate lines and the data lines through the pad part.

The top case 30 is provided to cover a front edge and each side of the display panel 10. The top case 30 is applied for preventing the panel driver 20, connected to the pad part of the lower substrate 12, from being exposed to the outside.

Since the top case 30 is provided to cover the front edge of the display panel 10 so as to prevent the panel driver 20 from being exposed, the general display device has the following problems.

First, since the top case 30 is provided on the upper substrate 14, a thickness of the display device increases, and due to a step height between the top case 30 and the display panel 10, a stepped portion is formed at a front surface of the display device. For this reason, a sense of beauty in design is reduced.

Second, a bezel width of the display device increases due to a front width of the top case 30 that prevents the panel driver 20 from being exposed, causing a reduction in a sense of beauty in design.

SUMMARY

Accordingly, the present invention is directed to provide a display device that substantially obviates one or more problems due to limitations and disadvantages of the related art.

An aspect of the present invention is directed to provide a display device with a minimized thickness and an enhanced aesthetic appearance.

Another aspect of the present invention is directed to provide a display device in which visual characteristic can be improved because external light is reflected by a metal line.

Another aspect of the present invention is directed to provide a display device in which static electricity applied from the outside is easily removed, and visual characteristic can be improved because external light is reflected.

In addition to the aforesaid objects of the present invention, other features and advantages of the present invention will be described below, but will be clearly understood by those skilled in the art from descriptions below.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device including a display panel, which includes a display area and a non-display area surrounding the display area, and a panel driver connected to the display panel in the non-display area of the display panel, the display panel including: an outer substrate configured to include a gate line and a data line that intersect with each other; an inner substrate coupled to a bottom of the outer substrate; and a reflection reduction member formed on the outer substrate to overlap at least one selected from the gate line and the data line, and configured to reduce a reflectivity of external light by a line.

The reflection reduction member may include a non-reflective conductive pattern formed on a top of the outer substrate, and configured to overlap at least one selected from the gate line and the data line to be connected to each other.

The non-reflective conductive pattern may be formed in a stacked structure including an oxide layer and a metal layer.

The oxide layer may be formed of Zn, In, or Sn-based oxide.

The metal layer may be formed of one metal material selected from Cu, Mo, Ti, Mo/Ti, and Cr.

The reflection reduction member may further include a protective layer formed on the top of the outer substrate to cover the non-reflective conductive pattern.

The protective layer may be formed of a single layer formed of SiNx, or the protective layer may be formed of a multilayer that includes an insulating layer formed of SiNx and a conductive layer formed of conductive oxide.

The display device may further include an electricity removing layer formed on the top of the outer substrate to cover the reflection reduction member.

The reflection reduction member may be formed between the outer substrate and one selected from the gate line and the data line.

The reflection reduction member may be formed of one material selected from a black material, polyamide, and a light-absorbing material.

The display device may further include a blocking layer formed on an inner surface of the outer substrate to cover the reflection reduction member, wherein the blocking layer electrically insulates the gate line and the data line from the reflection reduction member.

The reflection reduction member may be formed in a stacked structure including two or more layers which include an oxide layer and a metal layer.

The reflection reduction member may be formed of a semitransparent material, and the gate line may include first and second metal layers formed of different materials on the reflection reduction member.

The display device may further include an electricity removing layer formed on the top of the outer substrate.

The electricity removing layer may be formed of one material selected from a transparent metal oxide material, a transparent organic conductive material, and indium gallium zinc oxide (IGZO), or the electricity removing layer may be formed of a multilayer including a transparent conductive layer and a protective layer.

The display device may further include an upper polarization member formed on the top of the outer substrate, wherein the upper polarization member includes an electricity removing film, which includes an electricity removing layer, and a polarizing film that polarizes light.

The display device may further include: an edge sealing member formed at each of sides of the display panel; and a panel supporting part configured to include an external cover that surrounds each side of the display panel, in which the edge sealing member is formed, without protruding to a front surface of the display panel.

The edge sealing member may include a conductive member, and electrically connects the outer cover to at least one selected from the reflection reduction member and the electricity removing layer.

The edge sealing member may cover an upper edge of the reflection reduction member or an upper edge of the electricity removing layer.

The display device may further include a conductive strap configured to electrically connect the outer cover to at least one selected from the reflection reduction member and the electricity removing layer, wherein one side of the conductive strap is covered by the edge sealing member, and the other of the conductive strap is electrically connected to an inner surface of the external cover through the edge sealing member.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

The terms described in the specification should be understood as follows.

As used herein, the singular forms "a", "an" and "the" are intended to include the plural forms as well, unless the context clearly indicates otherwise. The terms "first" and "second" are for differentiating one element from the other element, and these elements should not be limited by these terms.

It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

The term "on" should be construed as including a case where one element is formed at a top of another element and moreover a case where a third element is disposed therebetween.

Hereinafter, a display device according to embodiments of the present invention will be described in detail with reference to the accompanying drawings.

Figure 1:
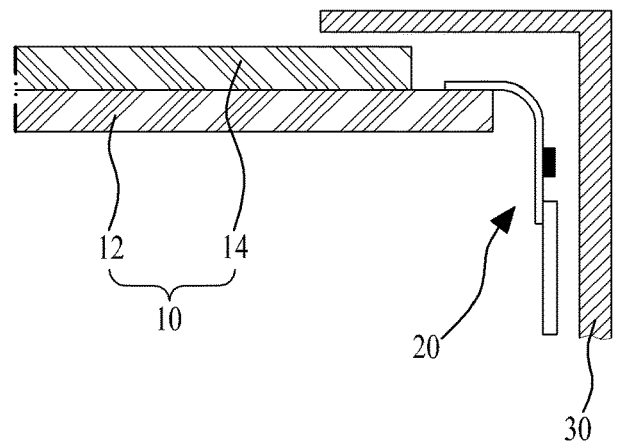
FIG. 1 is a schematic cross-sectional view of a general display device.
Figure 2:
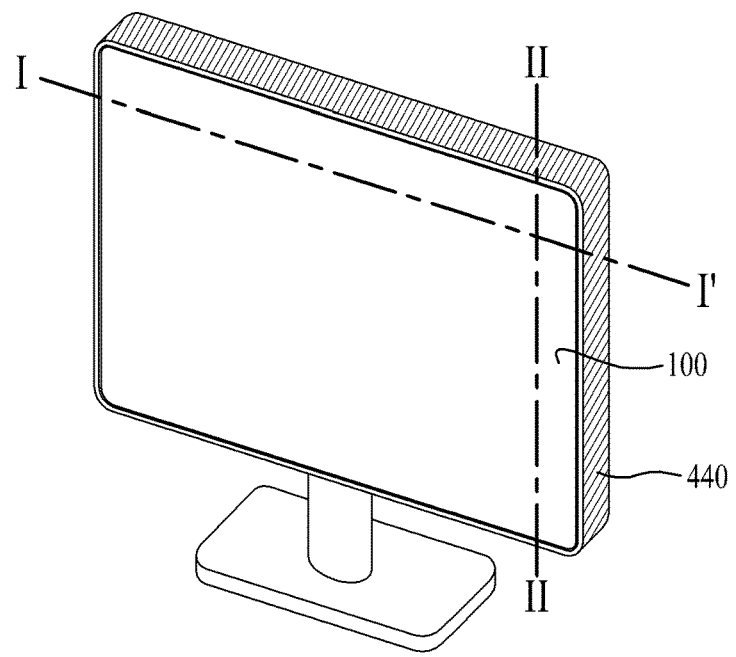
FIG. 2 is a view illustrating a display device according to a first embodiment of the present invention.
Figure 3:
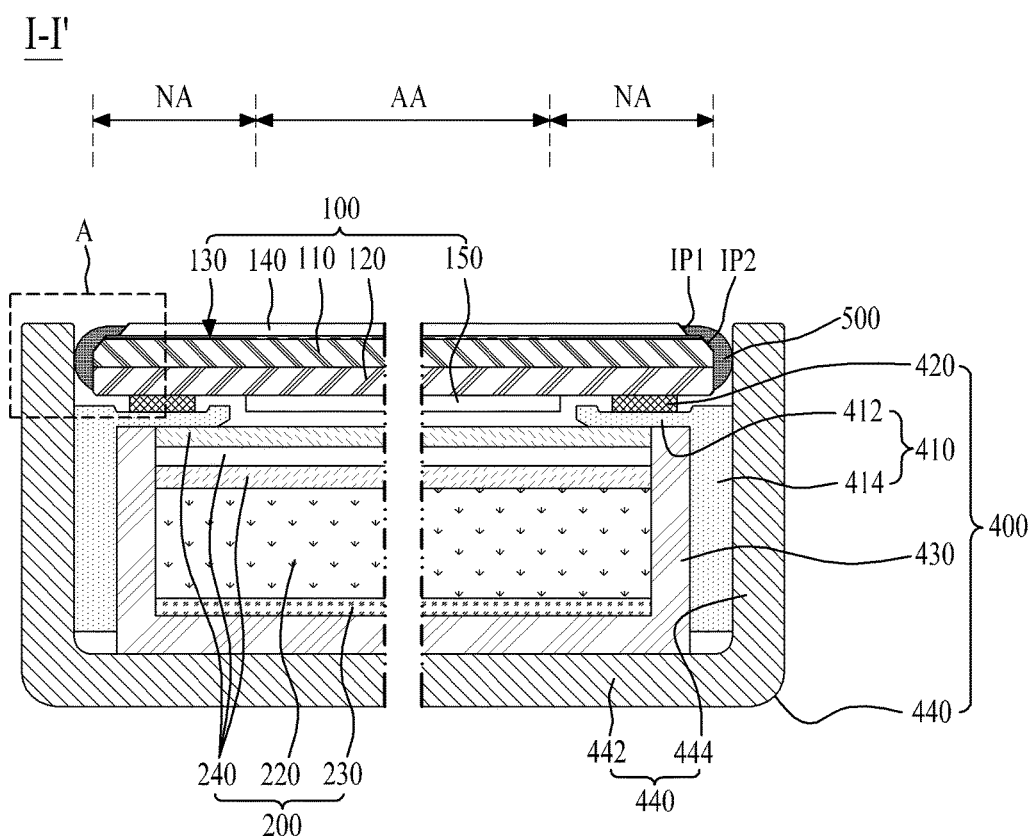
FIG. 3 is a cross-sectional view taken along line I-I' of FIG. 2.
Figure 4:
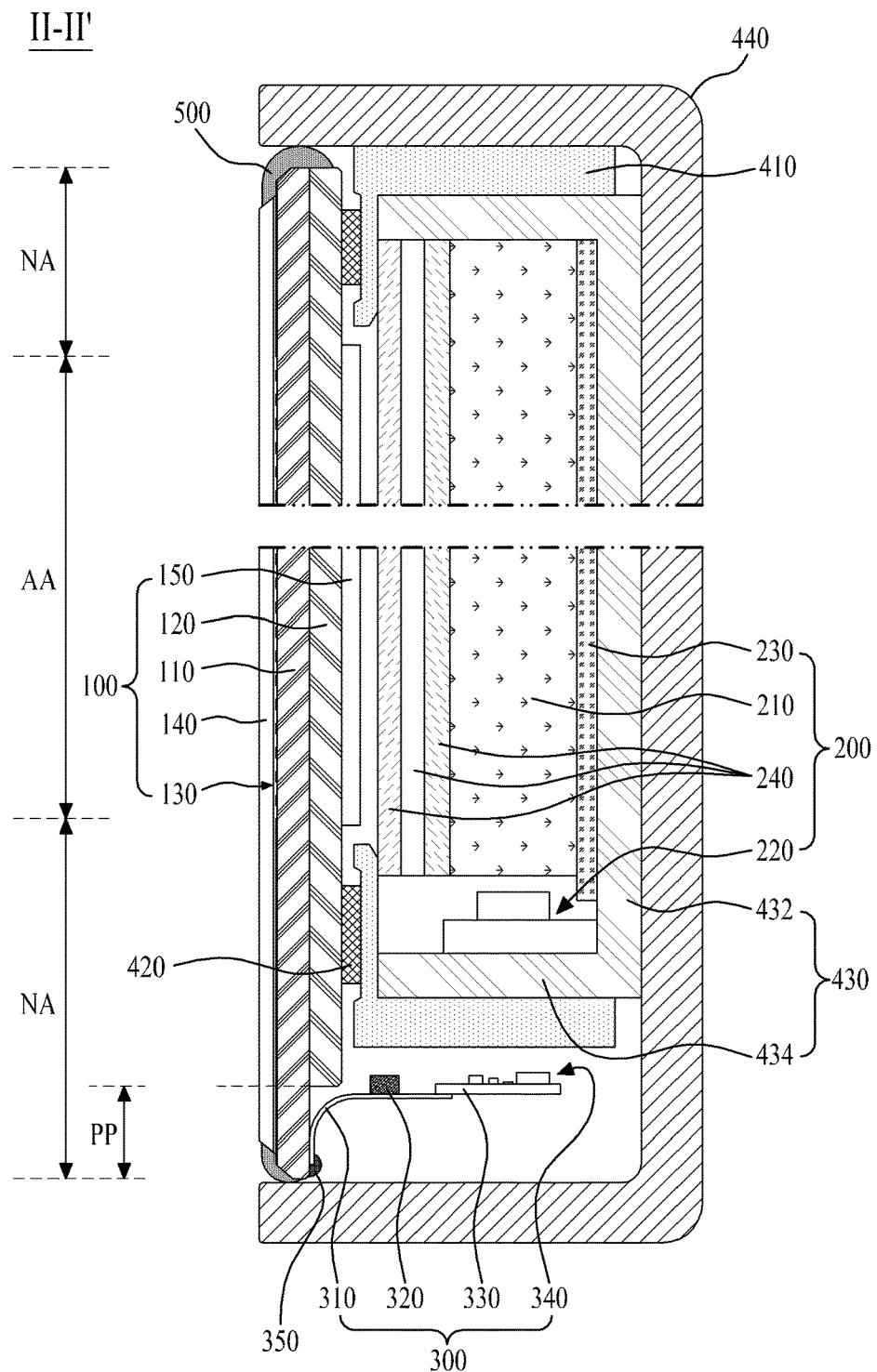
FIG. 4 is a cross-sectional view taken along line II-II' of FIG. 2.

FIG. 2 is a view illustrating a display device according to a first embodiment of the present invention. FIG. 3 is a cross-sectional view taken along line I-I' of FIG. 2. FIG. 4 is a cross-sectional view taken along line II-II'.

Referring to FIGS. 2 to 4, the display device according to the first embodiment of the present invention includes: a display panel 100 that includes a display area AA and a non-display area NA surrounding the display area AA; a backlight unit 200 that irradiates light onto the display panel 100; a panel driver 300 that is connected to the display panel 100 in the non-display area NA of the display panel 100; and a panel supporting part 400 that accommodates the backlight unit 200 and the panel driver 300, and surrounds a rear surface and four sides of the display panel 100 without protruding to a front surface of the display panel 100.

The display panel 100 includes an outer substrate 110, an inner substrate 120, a reflection reduction member 130, an upper polarization member 140, and a lower polarization member 150.

The outer substrate 110 is a thin film transistor (TFT) array substrate, and includes the display area AA and the non-display area NA surrounding the display area AA.

The display area AA of the outer substrate 110 includes a plurality of pixels which are respectively formed in a plurality of pixel areas provided by intersections between a plurality of gate lines (not shown) and a plurality of data lines (not shown). Each of the plurality of pixels includes a TFT connected to a gate line and a data line, a pixel electrode connected to the TFT, and a common electrode that is formed adjacent to the pixel electrode and receives a common voltage. The common electrode may be formed on the inner substrate 120 instead of the outer substrate 110 depending on a driving mode of a liquid crystal layer. The outer substrate 110 generates an electric field corresponding to a difference voltage between the common voltage and a data voltage applied to each pixel to adjust a light transmittance of the liquid crystal layer.

The non-display area NA of the outer substrate 110 may be defined as an edge area of the outer substrate 110 which surrounds upper, lower, left, and right sides of the display area AA, and may include a pad part PP and a gate driving circuit (not shown).

The pad part may be provided at one side edge of the outer substrate 110, and may include a plurality of pads that are connected to a plurality of signal lines, for example, a plurality of data lines, a plurality of gate control signal lines, and a plurality of power lines.

The gate driving circuit is provided at one side of short side or both non-display areas NA of the outer substrate 110 at the same time with a process of manufacturing the TFT of each pixel, connected to the plurality of gate lines formed in the display area AA, and connected to the pad part PP through the gate control signal lines. The gate driving circuit generates a gate signal (or a scan signal) according to a gate control signal which is supplied from the panel driver 300 through the pad part PP and the gate control signal line, and supplies the gate signal to a corresponding gate line.

The inner substrate 120 is a color filter array substrate, and is formed to have a relatively smaller area than that of the outer substrate 110. The inner substrate 120 is facing-coupled to a bottom of the outer substrate 110 except the pad part PP of the outer substrate with the liquid crystal layer (not shown) therebetween by a substrate coupling member (115 in FIG. 6).

The inner substrate 120 includes a light blocking layer (not shown), which is formed at an edge of the inner substrate 120 and defines a pixel area corresponding to each pixel formed on the outer substrate 110, and a color filter layer (not shown) that is formed in each pixel. The light blocking layer may be formed on the inner substrate 120 so as to define the pixel area. However, a function of the light blocking may be performed by the reflection reduction member 130 formed on the outer substrate 110, and thus, the light blocking layer may not be provided. The color filter layer filters light, which is incident from the backlight unit through the inner substrate 120 and the liquid crystal layer, to color light.

The reflection reduction member 130 reduces a reflectivity of external light by a metal line formed at an inner surface of the outer substrate 110, and removes static electricity applied from the outside, thereby enhancing visual characteristic shown in the display panel 100 and preventing a quality of an image from being degraded due to the static electricity. For example, the reflection reduction member 130 may include a non-reflection conductive pattern that is formed of a conductive material on the outer substrate 110, and overlaps at least one selected from a gate line and a data line so as to be connected to each other. For example, the non-reflection conductive pattern may be formed in a grid pattern form, in which the non-reflection conductive pattern overlaps the gate line, or a lattice pattern form in which the non-reflection conductive pattern overlaps the gate line and the data line.

The upper polarization member 140 is adhered to the outer substrate 110 so as to cover the reflection reduction member 130. The upper polarization member 140 according to an embodiment may include a polarizing film which is adhered to a top of the outer substrate 110, and polarizes light passing through the pixel area of the outer substrate 110. The upper polarization member 140 according to another embodiment may include an upper polarizing film, which is adhered to the top of the outer substrate 110 and polarizes the light passing through the pixel area of the outer substrate 110, and a retarder film which is adhered to the upper polarizing film, and separates a three-dimensional (3D) image (i.e., a left image and a right image), displayed by the display panel 100, into different polarization states.

The lower polarizing member 150 may include a lower polarizing film that polarizes a light which is incident from the backlight unit 200 onto the inner substrate 120.

The backlight unit 200 is accommodated in the panel supporting part 400, and irradiates light onto the display panel 100. To this end, the backlight unit 200 includes a light guide panel 210, a light source 220, a reflective sheet 230, and an optical sheet member 240.

The light guide panel 210 is formed in a flat (or wedge) shape, and travels light, which is incident through a light incident surface from the light source 220, to the display panel 100.

The light source 220 is disposed to face the light incident surface that is provided on at least one side of the light guide panel 210, and irradiates the light onto the light guide panel 210. In this case, the light source 220 may include a fluorescent lamp or a light emitting diode (LED).

The reflective sheet 230 is disposed at a bottom of the light guide panel 210, and reflects the light, which is incident from the light guide panel 210, to the display panel 100. The reflective sheet 230 may be disposed to support the bottom of the light guide panel 210, or may support the bottom of the light guide panel 210 and surround sides other than the light incident surface of the light guide panel 210.

The optical sheet member 240 is disposed on the light guide panel 210, and enhances a luminance characteristic of the light which travels from the light guide panel 210 to the display panel 100. To this end, the optical sheet member 240 may include at least one diffusive sheet, which diffuses the light, and at least one prism sheet that collects the diffused light, or may include a complex functional sheet that simultaneously diffuses and collects the light.

The panel driver 300 is connected to the pad part PP which is provided on the outer substrate 110 of the display panel 100, and allows a two-dimensional (2D) image based on a 2D display mode and a 3D image based on a 3D display mode to be displayed in the display area AA of the display panel 100. For example, the panel driver 300 includes a plurality of flexible circuit films 310 connected to the pad part PP, a data driving integrated circuit (IC) mounted on each of the plurality of flexible circuit films 310, a printed circuit board (PCB) 330 connected to the plurality of flexible circuit films 310, and a driving circuit unit 340 mounted on the PCB 330.

Each of the plurality of flexible circuit films 310 is adhered to the pad part PP and the PCB 330, and may include a tape carrier package (TCP) or a chip on flexible board (or a chin on film (COF). Each of the plurality of flexible circuit films 310 is bent from the pad part PP, is accommodated in the panel supporting part 400, and is not exposed to a front surface and sides of the pad part PP. In this case, each of the plurality of flexible circuit films 310 may be connected to the pad part PP by a reverse bonding process, for preventing the bent flexible circuit film 310 from protruding in a side direction of the outer substrate 110 or from contacting a side wall of the panel supporting part 400. Here, according to the reverse bonding process, an end of the flexible circuit film 310 adhered to the pad part PP is adhered more adjacent to a side of the outer substrate 110 than a side of the inner substrate 120, and a bending area of the flexible circuit film 310 is adhered more adjacent to the side of the inner substrate 120 than the side of the outer substrate 110, whereby the flexible circuit film 310 is disposed apart from the outer substrate 110 in a direction from the side to the inside of the outer substrate 110. In order to prevent a connection failure of the flexible circuit film 310 caused by penetration of water and foreign materials, an end of the flexible circuit film 310 adjacent to the side of the outer substrate 110 may be protected by a resin thin film 350.

A first and/or last flexible circuit film(s) 310 of the plurality of flexible circuit films 310 supplies/supply the gate control signal, input from the driving circuit unit 340, to corresponding pads of the pad part PP.

A data driving IC 320 is mounted on each of the plurality of flexible circuit films 310. The data driving IC 320 converts digital image data, which is input through the PCB 330 from the driving circuit 340, into a data voltage, and supplies the data voltage to a corresponding data line through the pad part PP.

The PCB 330 is electrically connected to other side of each of the plurality of flexible circuit films 310, and transfers a signal, which is necessary for driving of the display panel 100, to a corresponding flexible circuit film 310.

The driving circuit part 340 is mounted on the PCB 330, and drives the data driving IC 320 and the gate driving circuit. For example, the driving circuit unit 340 includes a timing controller (not shown) that controls driving of the data driving IC 320 and the gate driving circuit and supplies external digital image data to a corresponding data driving IC 320, various power circuits (not shown), and a memory (not shown).

The panel supporting part 400 accommodates the backlight unit 200 and the panel driver 300, and is coupled to a rear edge of the display panel 100 in order for an entire front surface of the display panel 100 to be exposed to the outside. To this end, the panel supporting part 400 includes a guide frame 410, a panel coupling member 420, a supporting case 430, and an external cover 440.

The guide frame 410 is formed in a tetragonal frame shape so as to support the rear edge of the display panel 100, and is coupled to the rear edge of the display panel 100 by the panel coupling member 420. For example, the guide frame 410 may include a panel coupling part 412 and a guide side wall 414. The panel coupling part 412 is coupled to the rear edge of the display panel 110 by the panel coupling member 420. The guide side wall 414 is vertically formed at an outer edge of the panel coupling part 412 so as to have a certain height, and supports the panel coupling part 412.

The guide frame 410 may be divided into four or more sub-frames, and for example, may be configured with a plurality of sub-frames which are coupled to the display panel by the panel coupling member 420.

The panel coupling member 420 is provided at the panel coupling part 412 of the guide frame 410, and connects the display panel 100 to the guide frame 410. In this case, the panel coupling member 420 may be coupled to the inner substrate 120 of the display panel 100 in consideration of a coupling force and thicknesses of the guide frame 410 and the display panel 100, but is not limited thereto. For example, the panel coupling member 420 may be coupled to the lower polarization member 150. The panel coupling member 420 may be formed of a double-sided tape, a heat-hardening adhesive, or a photocurable adhesive.

The supporting case 430 is formed in a U-shape to have an accommodating space. The supporting case 430 supports (or accommodates) the backlight unit 200, and supports the guide frame 410. For example, the supporting case 430 may include a supporting plate 432 and a supporting side wall 434. The supporting plate 432 is formed in a flat shape so as to cover a rear surface of the display panel 100, and supports the backlight unit 200. The supporting side wall 434 is vertically formed at an edge of the supporting plate 432, allows an accommodating space to be provided on the supporting plate 432, and supports the panel coupling part 412 of the guide frame 410. Optionally, the supporting case 430 may not be provided for designing, lightening, and slimming of the display device.

The external cover 440 accommodates the supporting case 430, and surrounds the guide frame 410 and the side of the display panel 100 in order for the entire front surface of the display panel 100 to be exposed. The external cover 440 may be formed of a plastic material or a metal material, but may be formed of a metal material for enhancing an aesthetic appearance of a manufactured display device and/or a discharging path of static electricity applied to the display panel 100. For example, the external cover 440 includes a rear cover 442 and a side cover 444.

The rear cover 442 configures the outermost rear surface of the manufactured display device, and supports the supporting case 430. For example, the rear cover 442 may be coupled to the supporting case 430 by a coupling (or bonding) method using a screw. Optionally, when the supporting case 430 is not provided, the rear cover 442 supports the backlight unit 200.

The side cover 444 configures the outermost side of the manufactured display device, and is formed vertically from an edge of the rear cover 442 to surround the guide frame 410 and the side of the display panel 100. In this case, a height of the side cover 444 is set so that a top of the side cover 444 does not protrude onto the display panel, and more particularly, a front surface of the upper polarization member 140. The side cover 444 may be coupled to a guide side wall 414 of the guide frame 410 by a coupling (or bonding) method using a hook, a screw, or a rail using a groove and a projection.

The display device according to the first embodiment of the present invention may further include an edge sealing member 500 that protects each side of the display panel 100, and discharges static electricity, applied to the display panel 100, to the panel supporting part 400.

The edge sealing member 500 is provided at each side of the display panel 100. For example, the edge sealing member 500 is provided at sides other than a lower side of the display panel 100 (in which the pad part PP is provided) so as to cover a portion of a side of the upper polarization member 140, a portion of a side of the inner substrate 120, an entire side of the outer substrate 110, and an entire side of the reflection reduction member 130. In addition, the edge sealing member 500 is provided at the lower side of the display panel 100 (in which the pad part PP is provided) so as to cover a portion of the side of the upper polarization member 140, an entire side of the reflection reduction member 130, and a portion of the side of the outer substrate 110.

An upper corner of each side of the outer substrate 110 and each side of the reflection reduction member 130 have a first inclined plane IP1 having a first slope, for increasing an adhesive area between the edge sealing member 500 and the display panel 100 and preventing the edge sealing member 500 from being stripped. Each side of the upper polarization member 140 has a second inclined plane IP2, which is separated by a certain distance from the first inclined plane IP1 and has a second slope which is the same as or different from the first slope, for exposing a top edge of the reflection reduction member 130 so as to increase an electrical connection area between the edge sealing member 500 and the reflection reduction member 130 and to prevent the upper polarization member 140 from being stripped.

Here, a light blocking material may be formed at the first inclined plane IP 1, for preventing a side light leakage of the display panel 100 caused by the total internal reflection of the inner substrate 120.

Figure 5:
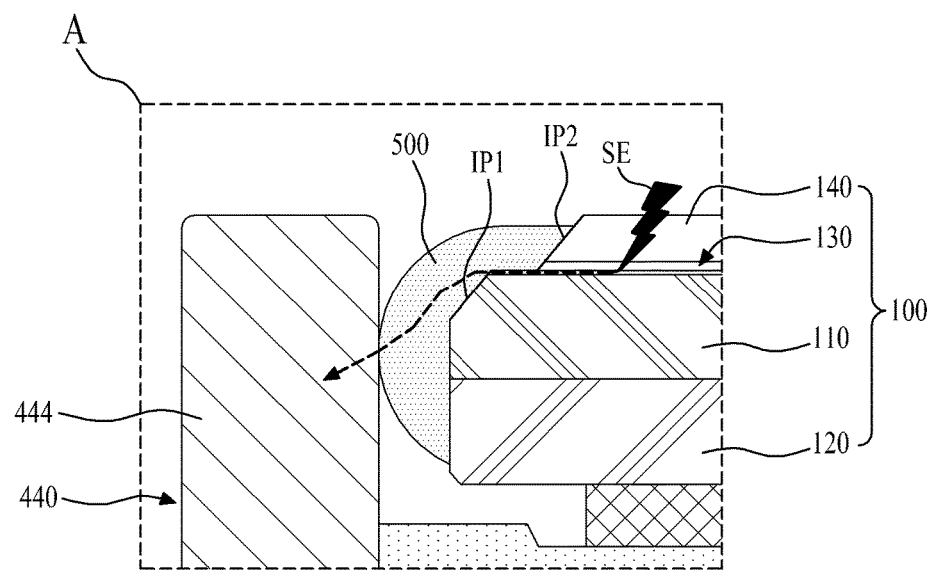
FIG. 5 is an enlarged view of a portion A of FIG. 3.

The edge sealing member 500, as illustrated in FIG. 5, is electrically connected to a top edge (i.e., a portion between the first and second inclined planes) of the reflection reduction member 130 (which is not covered by the upper polarization member 140) and an entire side of the reflection reduction member 130, and electrically and physically contacts the side cover 444 of the external cover 440, thereby discharging static electricity SE, applied to the reflection reduction member 130, to the panel supporting part 400 (more particularly, the side cover 444 of the external cover 440).

The edge sealing member 500 may be formed of a mixing material of a conductive member and an adhesive material such as a silicon-based or ultraviolet (UV)-hardening sealant (or a resin). For example, the conductive member may be a conductive ball, a particle, or a nanowire, and may be formed of a conductive material such as gold (Au), silver (Ag), or copper (Cu). Also, the edge sealing member 500 may include a colored resin or a light blocking resin, for preventing a side light leakage of the display panel 100 caused by the total internal reflection of the inner substrate 120.

Figure 6:
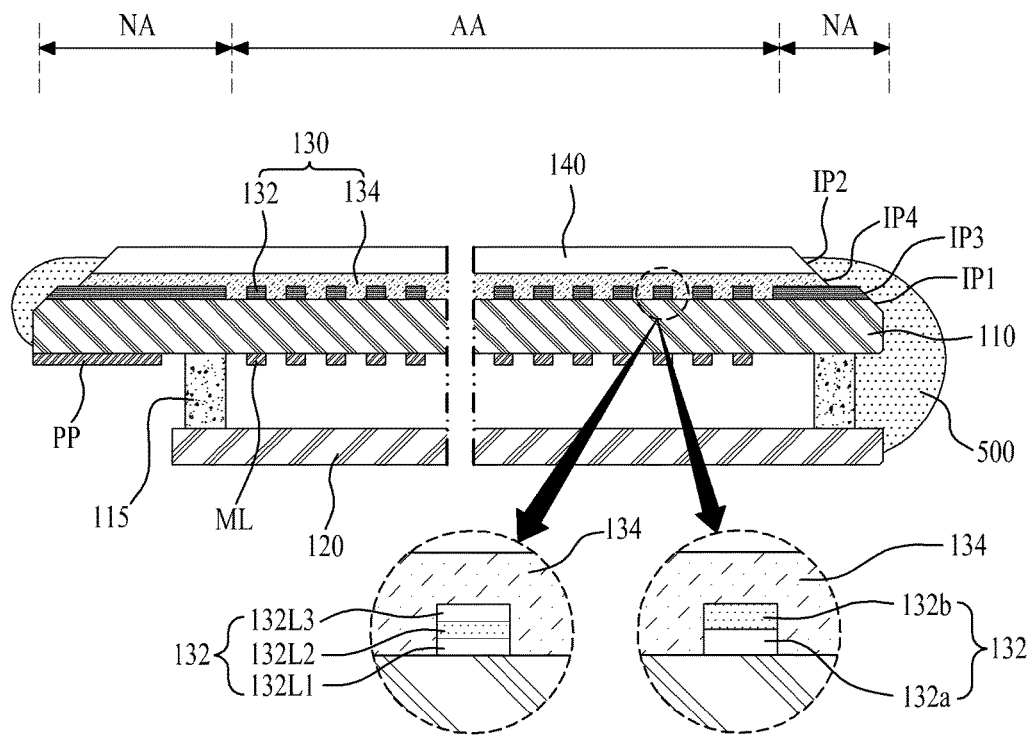
FIG. 6 is a cross-sectional view for describing a reflection reduction member of FIGS. 3 and 4.

FIG. 6 is a cross-sectional view for describing the reflection reduction member of FIGS. 3 and 4.

Referring to FIG. 6, the reflection reduction member 130 according to an embodiment of the present invention includes a non-reflective conductive pattern 132 which is formed at a top of the outer substrate 110 so as to overlap a metal line ML formed at the inner surface of the outer substrate 110.

The non-reflective conductive pattern 132 may be formed of a conductive metal material, and particularly, may be formed in a stacked structure having two or more layers including an oxide layer 132a and a metal layer 132b, for reducing reflectivity. For example, the non-reflective conductive pattern 132 may be formed in a two-layer structure having the oxide layer 132a and the metal layer 132b. As another example, the non-reflective conductive pattern 132 may be formed in a three-layer structure having a first metal layer 132L1, an oxide layer 132L2, and a second metal layer 132L3, in which case the first and second metal layers 132L1 and 132L3 may be formed of the same material or different materials. As another example, the non-reflective conductive pattern 132 may be formed in a three-layer structure having a first oxide layer 132L1, a metal layer 132L2, and a second oxide layer 132L3, in which case the first and second oxide layers 132L1 and 132L3 may be formed of the same material or different materials. In the non-reflective conductive layer 132, the oxide layer 132a may include Zn, In, or Sn-based oxide, and the metal layer 132b may include one selected from Cu, Mo, Ti, Mo/Ti, and Cr.

The non-reflective conductive pattern 132 may have black or a chromatic color depending on a metal material and a stacked structure. For example, when the non-reflective conductive pattern 132 is formed in a two-layer structure having the metal layer of Mo/Ti and the oxide layer 132a of indium tin oxide (ITO), the non-reflective conductive pattern 132 may have deep blue. As another example, when the non-reflective conductive pattern 132 has a three-layer structure including a first metal layer of Cu, an oxide layer of ITO, and a second metal layer of Mo/Ti, the non-reflective conductive pattern 132 may have black. As described above, when the non-reflective conductive pattern 132 has a color, an entire edge of the display device has a specific color, thereby enhancing an aesthetic design of the display device.

Each of four sides of the non-reflective conductive pattern 132 may be formed to have the same third inclined plane IP3 as the first inclined plane IP1 by using a chamfer process of forming the first inclined plane IP1 at a top corner of the outer substrate 110.

Figure 7A:
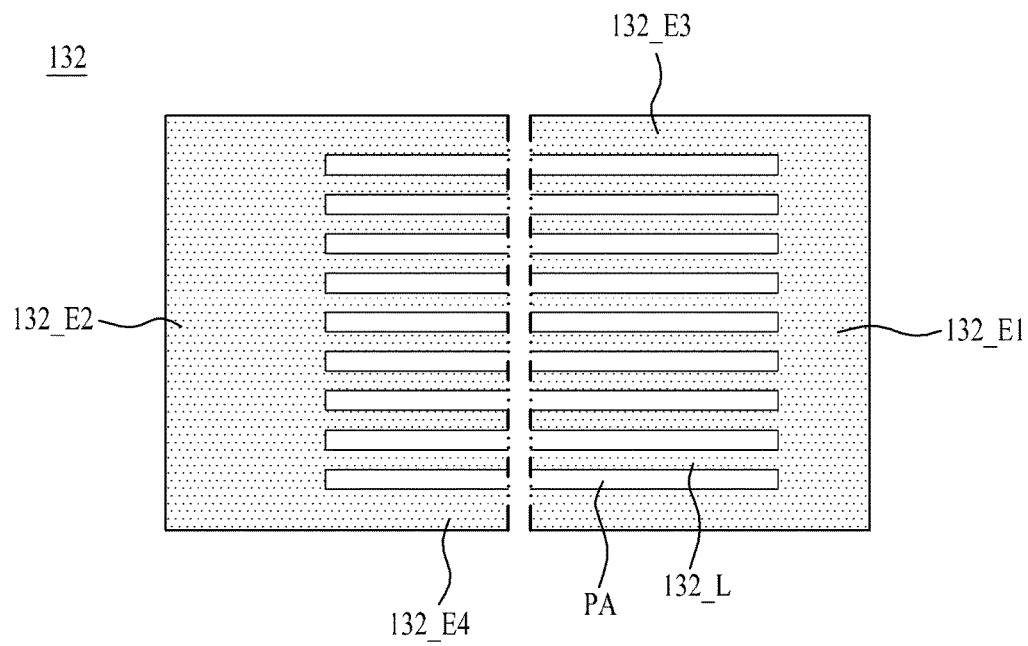
FIGS. 7A and 7B are views respectively illustrating examples a non-reflection conductive pattern in a reflection reduction member according to an embodiment of the present invention.

The non-reflective conductive pattern 132 according to an embodiment, as illustrated in FIG. 7A, may be formed at a top of the outer substrate 110 so as to overlap with a gate line which is formed at the inner surface of the outer substrate 110. That is, the non-reflective conductive pattern 132 according to an embodiment includes: first to fourth conductive border patterns 132_E1, 132_E2, 132_E3 and 132_E4 which are formed in a tetragonal frame shape so as to respectively overlap upper, lower, left, and right non-display areas corresponding to an edge of the outer substrate 110; and a plurality of conductive line patterns 132_L which are formed in a grid pattern form in a display area except a pixel area PA so as to overlap with the gate line. In this case, each of the plurality of conductive line patterns 132_L is connected, in a grid pattern form, between the first and second conductive border patterns 132_E1 and 132_E2 (which are parallel to each other) with the display area therebetween.

Figure 7B:
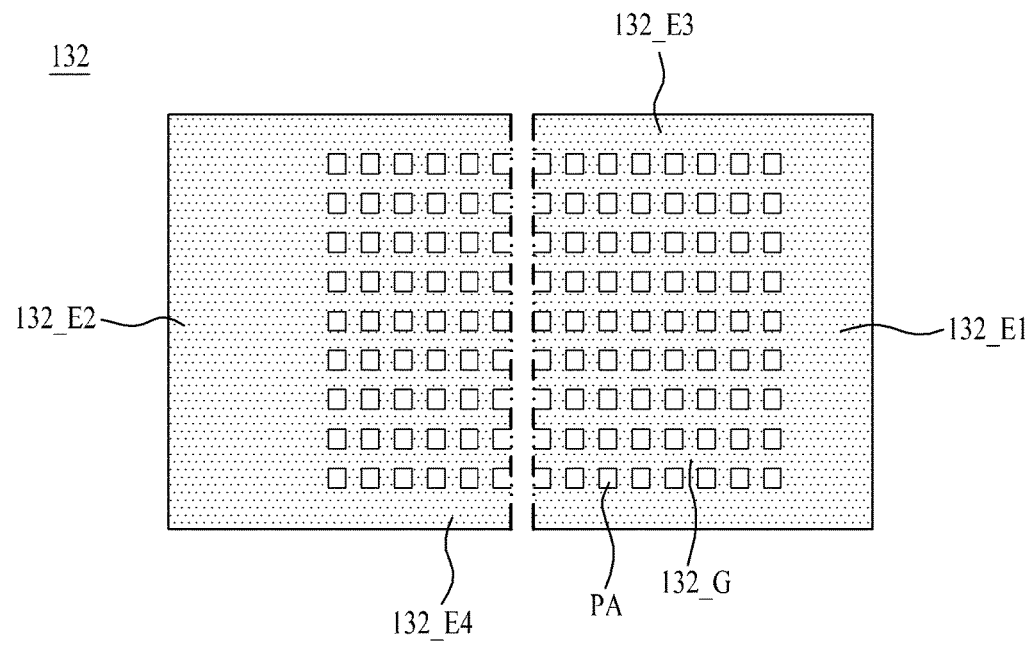

The non-reflective conductive pattern 132 according to another embodiment, as illustrated in FIG. 7B, may be formed at the top of the outer substrate 110 so as to overlap a gate line and a data line which are formed at the inner surface of the outer substrate 110. That is, the non-reflective conductive pattern 132 according to an embodiment includes: first to fourth conductive border patterns 132_E1, 132_E2, 132_E3 and 132_E4 which are formed in a tetragonal frame shape so as to respectively overlap the upper, lower, left, and right non-display areas corresponding to the edge of the outer substrate 110; and a plurality of conductive lattice patterns 132_G which are formed in a lattice pattern form in the display area except the pixel area PA so as to overlap the gate line and the data line. In this case, each of the plurality of conductive lattice patterns 132_G is connected, in a lattice pattern form, to the first to fourth conductive border patterns 132_E1, 132_E2, 132_E3 and 132_E4 which surround the display area.

In the non-reflective conductive pattern 132 according to an embodiment and the non-reflective conductive pattern 132 according to another embodiment, the first conductive border pattern 132_E1 may overlap an upper non-display area of the outer substrate 110, the second conductive border pattern 132_E2 may overlap a lower non-display area of the outer substrate 110, the third conductive border pattern 132_E3 may overlap a left non-display area of the outer substrate 110, and the fourth conductive border pattern 132_E4 may overlap a right non-display area of the outer substrate 110. In this case, the second conductive border pattern 132_E2 may overlap the pad part PP which is provided on the outer substrate 110, and the third and fourth conductive border patterns 132_E3 and 132_E4 may overlap the gate driving circuit which is provided on the outer substrate 110.

The reflection reduction member 130 according to an embodiment of the present invention may further include a protective layer 134 that is formed on the outer substrate 110 to protect the non-reflective conductive pattern 132.

The protective layer 134 prevents the non-reflective conductive pattern 132 from being damaged by a substrate manufacturing process that forms a TFT array (or a pixel array), connected to a gate line and a data line, on a bottom of the outer substrate 110. That is, when the TFT array is formed on the bottom of the outer substrate 110 and then the reflection reduction member 130 is formed on a top of the outer substrate 110, the TFT array can be damaged by a manufacturing process of forming the reflection reduction member 130. In order to prevent the TFT array from being damaged, the reflection reduction member 130 is first formed on the top of the outer substrate 110, and then, the TFT array is formed on the bottom of the outer substrate 110. Therefore, in a TFT array manufacturing process, the reflection reduction member 130 contacts a substrate transferring member or a substrate supporting member in a process of transferring or supporting the outer substrate 110, and thus, the protective layer 134 is applied for preventing the reflection reduction member 130 from being damaged due to the contact.

The protective layer 134 according to an embodiment may be formed of a material having hardness of 9H or more. For example, the protective layer 134 may be formed of SiNx.

Four sides of the protective layer 134 may be formed to be separated from the first inclined IP1 by a certain distance in order for a top edge of the reflection reduction member 130 to be coupled to the edge sealing member 500. Furthermore, the upper polarization member 140 is adhered to an entire front surface of the protective layer 134. In this case, the four sides of the protective layer 134 may be separated from the first inclined plane IP1 by a certain distance using a cutting process (for example, a laser cutting process) of forming the second inclined plane IP2 at four sides of the upper polarization member 140, and may have a fourth inclined plane IP4 having a fourth slope that is the same as or different from the second slope.

In the display device according to the first embodiment of the present invention, since the entire front surface of the outer substrate 110 is exposed to the outside, and the panel driver 400 is adhered to the bottom of the outer substrate 110 and exposed to the outside, a separate external cover for covering the panel driver 400 is not needed. Therefore, according to an embodiment of the present invention, a thickness of the display device, and a front step height of the display device is removed, thereby obtaining an aesthetic design effect in which the front surface of the display device is recognized as one structure. Furthermore, according to an embodiment of the present invention, a bezel configuring a border of the display device can be fully removed, or even when the bezel is formed an aesthetic appearance of the display device can be enhanced compared to a related art display device since the width of the bezel is very small.

Moreover, according to an embodiment of the present invention, since the reflection reduction member 130 is formed of a conductive material on the outer substrate 110 so as to be connected to each other, a reflectivity of external light by the metal line formed on the outer substrate 110 is reduced, and static electricity applied from the outside is removed. Accordingly, visual characteristic which is shown in the display panel can be enhanced, and a quality of an image can be prevented from being degraded due to an inflow of static electricity.

Figure 8:
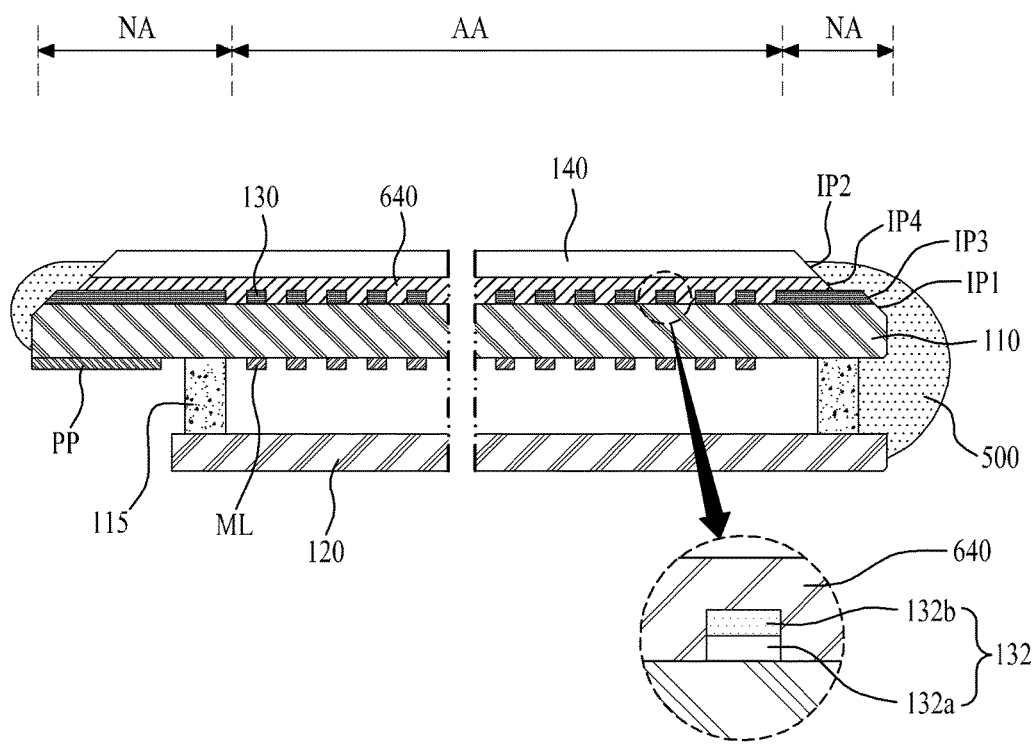
FIG. 8 is a cross-sectional view illustrating a display panel in a display device according to a second embodiment of the present invention.

FIG. 8 is a cross-sectional view illustrating a display panel in a display device according to a second embodiment of the present invention, and illustrates that an electricity removing layer is additionally formed on an outer substrate. In describing the second embodiment of the present invention, the same elements as those of the display device according to the first embodiment are not described. Hereinafter, only the electricity removing layer will be described.

An electricity removing layer 640 according to an embodiment may be formed of a material, having high heat resistance, transparency, corrosion resistance which does not react with an etchant of a metal line, and stiffness, on the outer substrate 110 so as to cover the reflection reduction member 130 formed at the top of the outer substrate 110, for removing static electricity applied from the outside to the inside of the display panel 100. The electricity removing layer 640 according to an embodiment may have electrical conductivity of $10^9$ Ω/sq or less, for easily removal of static electricity, and as described above, the electricity removing layer 640 may have hardness of 8H or more, for preventing the reflection reduction member 130 from being damaged by a physical contact which occurs in a process of manufacturing a TFT array. For example, the electricity removing layer 640 may be formed of a transparent metal oxide material, a transparent organic conductive material, or indium gallium zinc oxide (IGZO). Here, examples of the electricity removing layer formed of a transparent organic conductive material may include a graphene-polymer composite layer, a graphene-metal particle layer, or an organic transparent conductive layer.

The reflection reduction member 130 may include the non-reflective conductive pattern 132, or include the non-reflective conductive pattern 132 and the protective layer 134. Therefore, the electricity removing layer 640 according to an embodiment may be formed on the outer substrate 110 so as to cover the reflection reduction member 130 including only the non-reflective conductive pattern 132, or may be formed on the outer substrate 110 so as to cover the protective layer 134 of the reflection reduction member 130.

Figure 9:
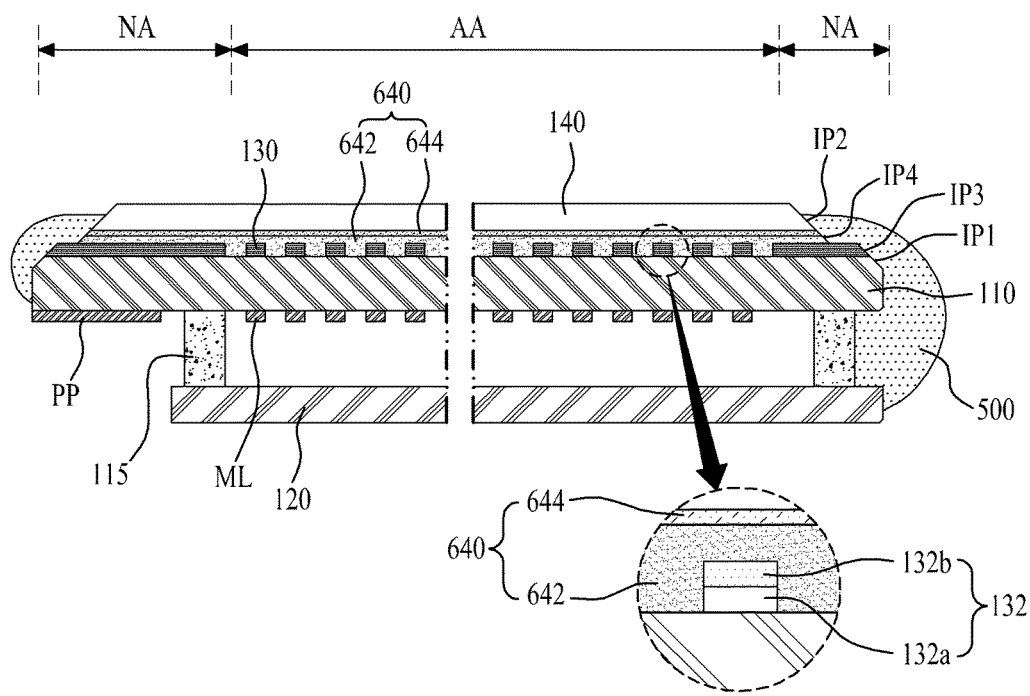
FIG. 9 is a view for describing another example of an electricity removing layer of FIG. 8.

The electricity removing layer 640 according to another embodiment, as illustrated in FIG. 9, may be formed on the outer substrate 110 so as to cover the reflection reduction member 130 formed on the top of the outer substrate 110, and may be formed of a multilayer including a transparent conductive layer 642 and a protective layer 644.

The transparent conductive layer 642 may be formed on the outer substrate 110 so as to cover the reflection reduction member 130 including only the non-reflective conductive pattern 132, and may be formed of Zn, In, or Sn-based oxide. The transparent conductive layer 642 may protect the non-reflective conductive pattern 132, and remove static electricity applied from the outside to the outer substrate 110.

The protective layer 644 may be formed on the outer substrate so as to cover the transparent conductive layer 642, and as described above, the protective layer 644 may have hardness of 8H or more, for protecting the transparent conductive layer 642 and preventing the reflection reduction member 130 from being damaged by a physical contact which occurs in a process of manufacturing a TFT array. For example, the protective layer 644 may be formed of SiNx.

Four sides of the electricity removing layer 640 according to an embodiment and another embodiment may be formed to be separated from the first inclined IP1 or the third inclined IP3 by a certain distance in order for a top edge of the reflection reduction member 130 to be coupled to the edge sealing member 500. Furthermore, the upper polarization member 140 is adhered to an entire front surface of the electricity removing layer 640. In this case, the four sides of the electricity removing layer 640 may be separated from the first inclined plane IP1 by a certain distance in a cutting process (for example, a laser cutting process) of forming the second inclined plane IP2 at four sides of the upper polarization member 140, and may have the fourth inclined plane IP4 having a fourth slope that is the same as or different from the second slope.

The electricity removing layer 640 according to an embodiment is formed on the outer substrate 110 so as to cover the reflection reduction member 130, is electrically and directly connected to the edge sealing member 500, and is electrically connected to the edge sealing member 500 through the top edge of the reflection reduction member 130, thereby discharging static electricity, applied from the outside, to the panel supporting part 400 through the edge sealing member 500. Accordingly, a quality of an image can be prevented from being degraded due to static electricity.

Figure 10:
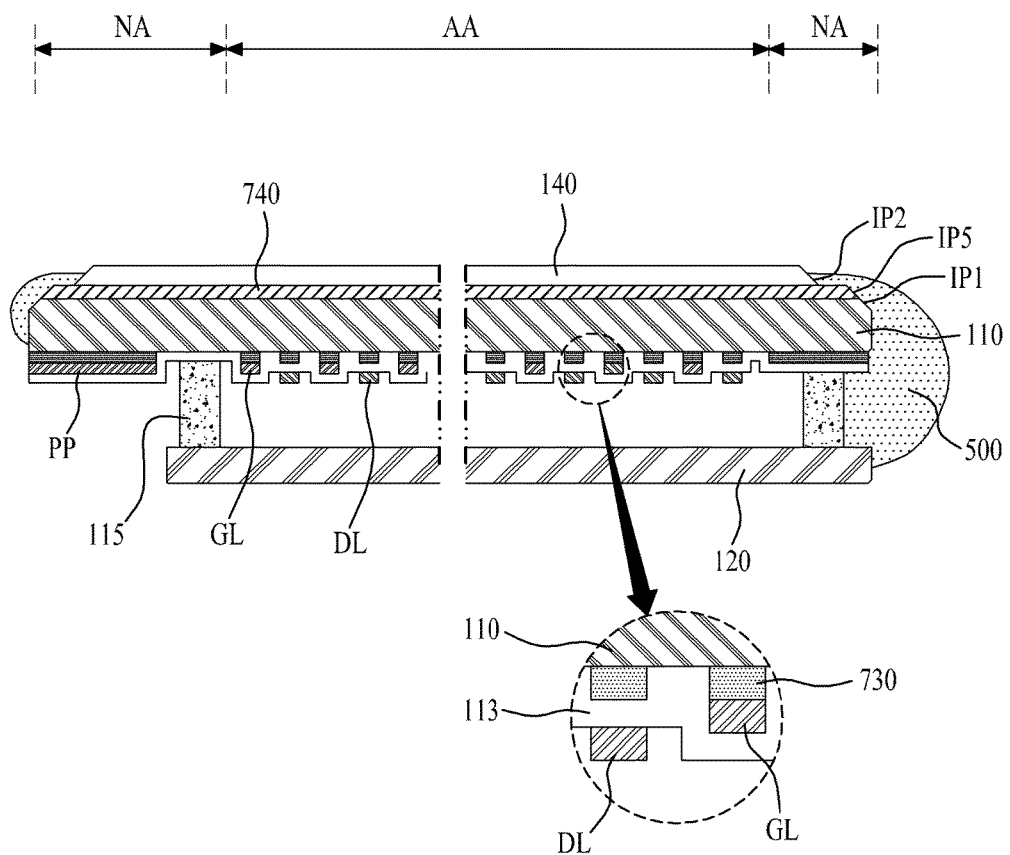
FIG. 10 is a cross-sectional view illustrating a display panel in a display device according to a third embodiment of the present invention.

FIG. 10 is a cross-sectional view illustrating a display panel in a display device according to a third embodiment of the present invention, and illustrates that unlike the display device according to the second embodiment of the present invention, a reflection reduction member 730 is formed on the inner surface of the outer substrate 110, and an electricity removing layer 740 is formed on the top of the outer substrate 110. In describing the third embodiment of the present invention, the same elements as those of the display device according to the preceding embodiments are not described. Hereinafter, only the reflection reduction member 730 and the electricity removing layer 740 will be described.

The reflection reduction member 730 according to an embodiment includes a non-conductive pattern which is formed between a gate line GL and the inner surface of the outer substrate, and minimizes or prevents reflection of external light (which passes through the outer substrate 110) by the gate line GL. In this case, the non-conductive pattern may be formed of a non-conductive material. For example, the non-conductive material may be a black material, polyamide, or a light-absorbing material. Here, the light-absorbing material may contain amorphous silicon (a-Si). Generally, since a-Si has high light absorptivity, a-Si is used to convert solar energy into electrical energy, and has about 100 times higher light absorptivity than that of crystalline silicon.

The reflection reduction member 730 according to an embodiment may be additionally formed between a data line DL and the inner surface of the outer substrate 110, for minimizing or preventing reflection of external light by the data line DL. In this case, a gate insulating layer 113 is formed between the reflection reduction member 730 and the data line.

The electricity removing layer 740 may be formed of a transparent metal oxide material, a transparent organic conductive material, or indium gallium zinc oxide (IGZO) on the entire front surface of the outer substrate 110, or may be formed of a multilayer including a transparent conductive layer and a protective layer. Here, an example of a material forming the electricity removing layer 740 may include a black pigment or a colored pigment.

Four sides of the electricity removing layer 740 may be formed to have a fifth inclined plane IP5 having a fifth slope, which is the same as and different from the first slope, by using a chamfer process of forming the first inclined plane IP1 at each of upper corners of the outer substrate 110. Furthermore, the upper polarization member 140 is adhered to an entire front surface of the electricity removing layer 740. In this case, in order to prevent the upper polarization member 140 from being stripped, the four sides of the upper polarization member 140 may be separated from the first inclined plane IP1 by a certain distance in a cutting process (for example, a laser cutting process) of forming the second inclined plane IP2 at the four sides of the upper polarization member 140. Therefore, an upper edge of the electricity removing layer 740 is exposed to the outside by the fifth inclined plane IP5 of the upper polarization member 140 which is separated from the first inclined plane IP1 of the outer substrate 110, and covered by the edge sealing member 500, and thus, the four sides and upper edge of the electricity removing layer 740 are electrically connected to the edge sealing member 500.

The display device according to the third embodiment of the present invention can obtain the same aesthetic design effect as that of the display devices according to the first and second embodiments of the present invention. According to the third embodiment, the reflection reduction member 730 is formed between the outer substrate 110 and the metal line, and the electricity removing layer 740 is formed on the front surface of the outer substrate 110. Therefore, a reflectivity of external light by the metal line formed on the outer substrate 110 is reduced, and static electricity applied from the outside is removed. Accordingly, visual characteristic shown in the display panel 100 can be enhanced, and a quality of an image can be prevented from being degraded due to an inflow of static electricity.

Figure 11:
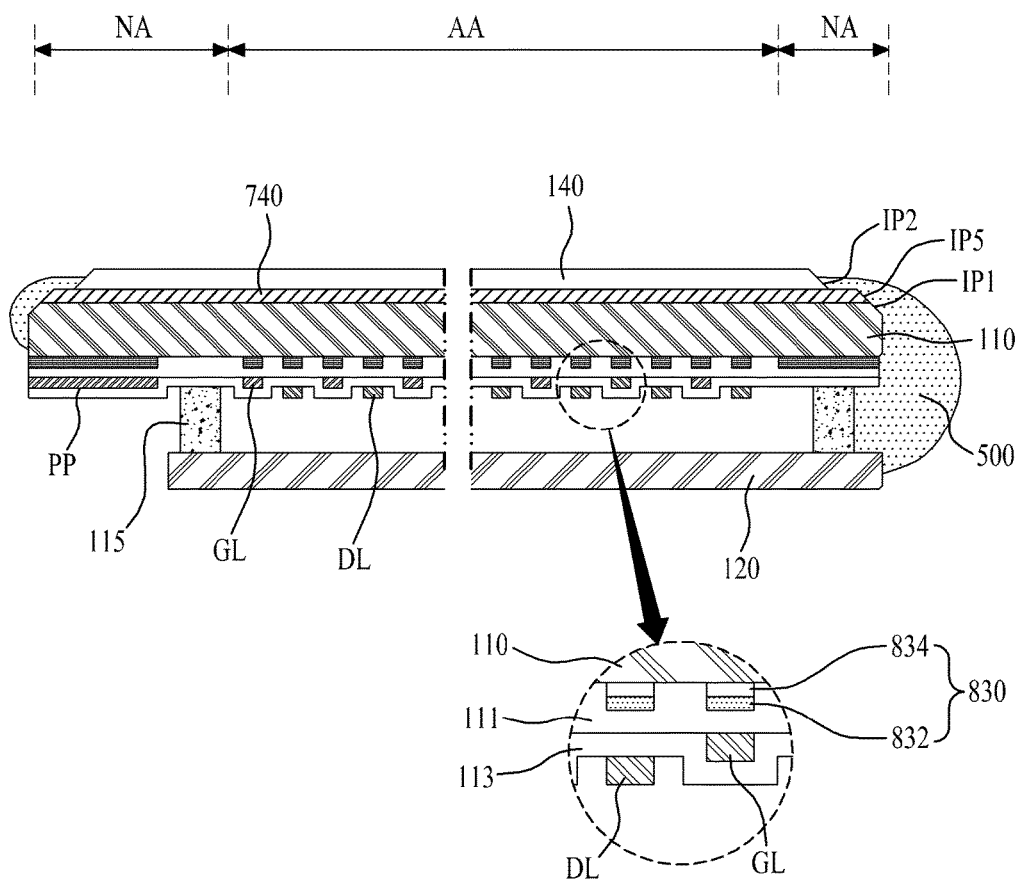
FIG. 11 is a cross-sectional view illustrating a display panel in a display device according to a fourth embodiment of the present invention.

FIG. 11 is a cross-sectional view illustrating a display panel in a display device according to a fourth embodiment of the present invention, and illustrates that unlike the display device according to the third embodiment of the present invention, a reflection reduction member 830 is formed of a low-reflection metal material, and a blocking layer 111 is additionally formed between a gate line GL and the reflection reduction member 830 formed of the low-reflection metal material. In describing the fourth embodiment of the present invention, the elements same as those of the display device according to the third embodiment are not described. Hereinafter, only the reflection reduction member 830 and the blocking layer 111 will be described.

The reflection reduction member 830 includes a conductive pattern. In this case, the conductive pattern may be formed of a conductive metal material, and particularly, may be formed in a stacked structure having two or more layers including an oxide layer 832 and a metal layer 834, for reducing reflectivity. For example, the reflection reduction member 830 may be formed in a two-layer structure having the oxide layer 832 and the metal layer 834. As another example, the reflection reduction member 830 may be formed in a three-layer structure having a first metal layer, an oxide layer, and a second metal layer, in which case the first and second metal layers may be formed of the same material or different materials. As another example, the reflection reduction member 830 may be formed in a three-layer structure having a first oxide layer, a metal layer, and a second oxide layer, in which case the first and second oxide layers may be formed of the same material or different materials. In the reflection reduction member 830, the oxide layer 832 may include Zn, In, or Sn-based oxide, and the metal layer 834 may include one selected from Cu, Mo, Ti, Mo/Ti, and Cr.

The blocking layer 111 is formed on the inner surface of the outer substrate 110 so as to cover the reflection reduction member 830 formed on the inner surface of the outer substrate 110, and electrically insulates the gate line GL from the reflection reduction member 830. The blocking layer 111 may be formed of an insulating material. For example, the blocking layer 111 may be formed of SiNx to have a thickness of 0.1 um to 0.5 um. As another example, the blocking layer 111 may be formed of a high heat-resistant organic material or an organic material containing a pigment/dye, and an example of the organic material may include a siloxane-based or polyimide-based material. The blocking layer 111 performs a function of a planarizing layer that planarizes the inner surface of the outer substrate 110 in which the reflection reduction member 830 is formed.

Figure 12:
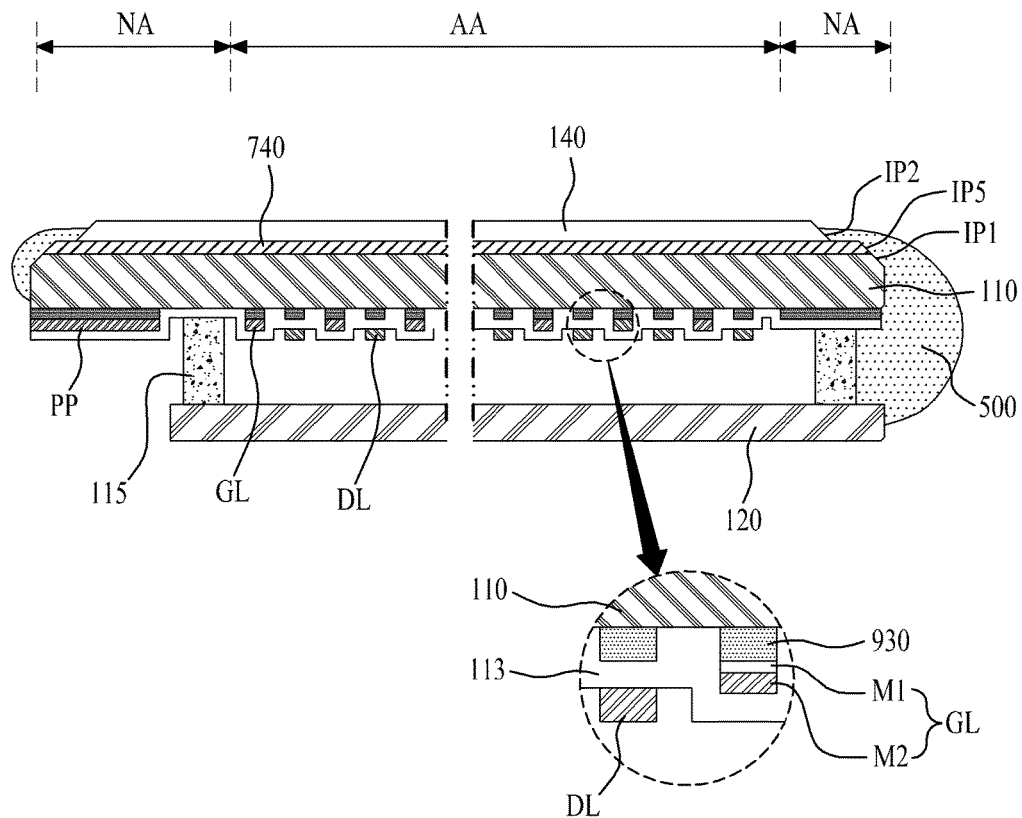
FIG. 12 is a cross-sectional view illustrating a display panel in a display device according to a fifth embodiment of the present invention.

FIG. 12 is a cross-sectional view illustrating a display panel in a display device according to a fifth embodiment of the present invention, and illustrates that unlike the display device according to the second embodiment of the present invention, a reflection reduction member 930 is formed of a semitransparent material, and a gate line GL having a two-layer structure is formed on the reflection reduction member 930. In describing the fifth embodiment of the present invention, the same elements as those of the display device according to the first embodiment are not described. Hereinafter, only the reflection reduction member 930 and the gate line GL will be described.

The reflection reduction member 930 is formed between the gate line GL and the inner surface of the outer substrate 110, and minimizes or prevents reflection of external light by the gate line GL passing the outer substrate 110 through destructive interference of light. The reflection reduction member 930 may be formed of one selected from indium tin oxide (ITO), indium zinc oxide (IZO), zinc oxide (ZnO), IGZO, aluminum zinc oxide (AZO), $In_2O_3$, $Ga_2O_3$—$In_2O_3$, ZnO:B, and ZnO—$In_2O_3$.

The gate line GL may be formed of a low-resistance metal material, and for example, may be formed of first and second metal layers M1 and M2 selected from Al, AlNd, Cu, copper alloy, CuNd, Mo, molybdenum alloy, and MoTi. For example, the first metal layer M1 may be formed of Mo/Ti on the reflection reduction member 930, and the second metal layer M2 may be formed of Cu.

Figure 13:
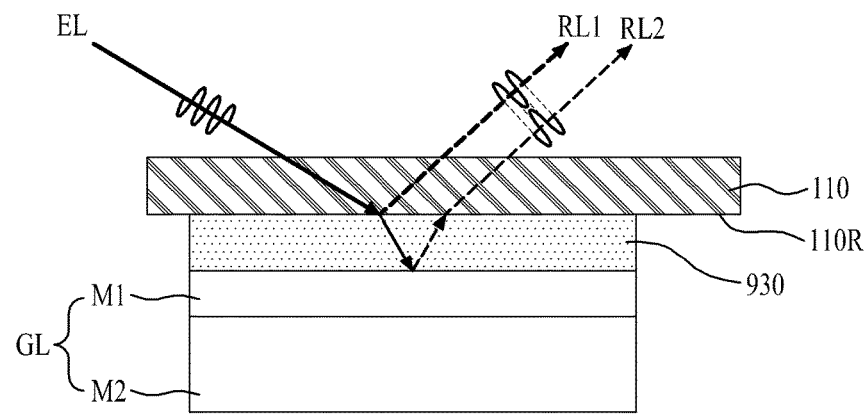
FIG. 13 is a view for describing destructive interference caused by reflection light of a gate line and a reflection reduction member illustrated in FIG. 12.

According to the fifth embodiment of the present invention, as illustrated in FIG. 13, some of external light EL incident on the outer substrate 110 is reflected as first reflection light RL1 by the reflection reduction member 930, and the other of the external light EL which passes through the reflection reduction member 930 without being reflected by the reflection reduction member 930 passes through the reflection reduction member 930, and is reflected as second reflection light RL2 by the first metal layer M1. However, the first and second reflection lights RL1 and RL2 are dissipated through destructive interference. To this end, a thickness of the reflection reduction member 930 is set so that the first and second reflection lights RL1 and RL2 are dissipated by destructive interference caused by a phase difference therebetween.

Figure 14:
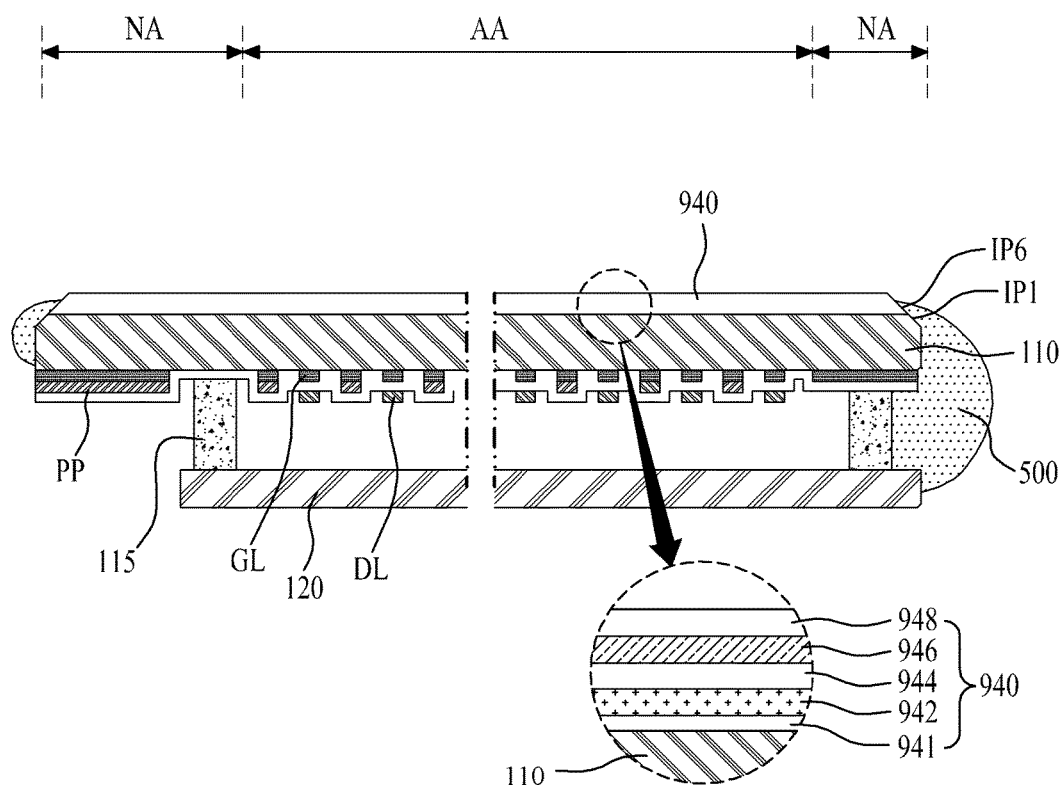
FIG. 14 is a cross-sectional view illustrating a display panel in a display device according to a sixth embodiment of the present invention.

FIG. 14 is a cross-sectional view illustrating a display panel in a display device according to a sixth embodiment of the present invention, and illustrates that unlike the display devices according to the third to fifth embodiments of the present invention, the electricity removing layer 740 is formed on an upper polarization member 940. In describing the sixth embodiment of the present invention, the same elements as those of the display devices according to the third to fifth embodiments are not described. Hereinafter, only the upper polarization member 940 will be described.

In the display devices according to the third to fifth embodiments, the electricity removing layer 740 for removing static electricity applied from the outside to the display panel is formed on the top of the outer substrate 110. However, according to the sixth embodiment of the present invention, the electricity removing layer 740 is not formed on the top of the outer substrate 110 but is formed at the upper polarization member 940.

The upper polarization member 940 may include an electricity removing film 942, a lower protective film 944, a polarizing film 946, and an upper protective film 948.

The electricity removing film 942 includes an electricity removing layer formed of a transparent conductive material, which may be arsenic (As). However, the present embodiment is not limited thereto.

The lower protective film 944 and the upper protective film 948 are formed with the polarizing film 946 therebetween, and protects the polarizing film 946.

The polarizing film 946 includes a polarizer that polarizes incident light. A poly vinyl alcohol film is dyed with iodine, and is drawn in a specific direction, thereby forming the polarizing film 946. The polarizing film 946 absorbs light which is incident in a drawn direction, but transmits light which is incident in a direction vertical to the drawn direction, thereby polarizing substantially incident light.

The upper polarization member 940 is adhered to the front surface of the outer substrate 110 through an adhesive layer 941 which is formed at a bottom of the electricity removing film 942.

Four sides of the upper polarization member 940 may be formed to have a sixth inclined plane IP6 having the same slope as that of the first inclined plane IP1 by using a chamfer process of forming the first inclined plane IP1 at each of corners of the outer substrate 110. Therefore, the electricity removing layer of the upper polarization member 940 according to an embodiment is electrically connected to the edge sealing member 500 that covers a portion of the sixth inclined plane IP6.

Figure 15:
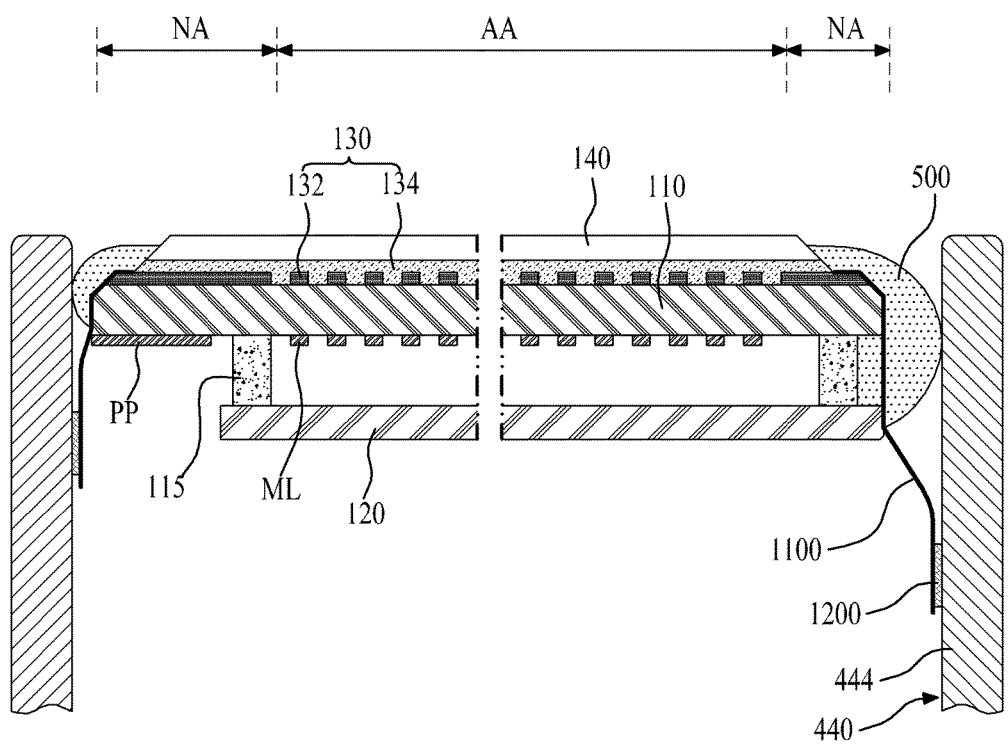
FIG. 15 is a cross-sectional view illustrating a display panel and an external cover in a display device according to a seventh embodiment of the present invention.

FIG. 15 is a cross-sectional view illustrating a display panel and an external cover in a display device according to a seventh embodiment of the present invention, and illustrates that unlike the display devices according to the first to fifth embodiments of the present invention, a conductive strap 1100 is additionally formed. In describing the seventh embodiment of the present invention, the elements same as those of the display devices according to the first to fifth embodiments are not described. Hereinafter, only the conductive strap 1100 will be described.

In the display devices according to the first and second embodiments of the present invention, the conductive strap 1100 according to an embodiment is provided as at least one on each side of the outer substrate 110, and electrically connects the non-reflective conductive pattern 132 of the reflection reduction member 140 to the side cover 444 of the external cover 440. In this case, one side of the conductive strap 1100 may be adhered to the non-reflective conductive pattern 132 exposed at the upper edge of the outer substrate 110, and the other of the conductive strap 1100 may pass through a lower portion of the edge sealing member 500, and may be adhered to an inner surface of the side cover 444 by a conductive coupling member 1200.

In the display devices according to the third to fifth embodiments of the present invention, the conductive strap 1100 according to another embodiment is provided as at least one on each side of the outer substrate 110, and electrically connects the electricity removing layer 640 (740) to the side cover 444 of the external cover 440. In this case, one side of the conductive strap 1100 may be adhered to the the electricity removing layer 640 (740) exposed at the upper edge of the outer substrate 110, and the other of the conductive strap 1100 may pass through the lower portion of the edge sealing member 500, and may be adhered to the inner surface of the side cover 444 by the conductive coupling member 1200.

The conductive coupling member 1200 may be a double-sided tape formed of a metal material, or may be a screw that directly connects the other side of the conductive strap 1100 to the inner surface of the side cover 444.

According to the seventh embodiment of the present invention, since the non-reflective conductive pattern 132 or electricity removing layer 640 (740) of the reflection reduction member 140 is electrically connected to the external cover 440 through the conductive strap 1100, the edge sealing member 500 may be formed of an adhesive material such as a silicon-based or UV-hardening sealant (or resin) without a conductive member, but considering a tack time, the edge sealing member 500 may be formed of a UV-hardening sealant. Also, the edge sealing member 500 may be colorless (or transparent) or colored (for example, blue, red, bluish green, or black), but is not limited thereto. A color of the edge sealing member 500 may be selected depending on a design of the display device, and in order to prevent a side light leakage of the display panel by the total internal reflection of the inner substrate 120, the edge sealing member 500 may be formed of a colored resin or a light blocking resin. When the edge sealing member 500 does not include a conductive member, the edge sealing member 500 may not contact the side cover 444 of the external cover 440.

Hereinabove, the LCD device has been mainly described as an example, but the display device according to the embodiments of the present invention is not limited to the LCD device. Examples of the display device according to the embodiments of the present invention may include various flat panel display devices such as organic light emitting display devices. For example, when the display device is an organic light emitting display device, an encapsulating substrate (not shown) instead of the inner substrate 120 is coupled to the bottom of the outer substrate 110, and the encapsulating substrate (not shown) does not include a color filter layer and a black matrix. The encapsulating substrate (not shown) may be formed of an opaque material such as aluminum foil or stainless steel in addition to transparent plastic or glass. Since the organic light emitting display device is a self-emitting device, the organic light emitting display device does not include the backlight unit 200.

The display device according to the embodiments of the present invention may be applied to notebook computers, tablet computers, and various portable information devices, in addition to televisions and monitors.

As described above, since the entire front surface of the outer substrate is exposed to the outside and the panel driver is adhered to the bottom of the outer substrate and exposed to the outside, a separate external cover for covering the panel driver is not needed. Therefore, a thickness of the display device is reduced, and a front step height of the display device is removed, thereby obtaining an aesthetic design effect in which the front surface of the display device is recognized as one structure.

Moreover, a bezel configuring the border of the display device can be fully removed, or although the bezel is formed, since a width of the bezel is very small, an aesthetic appearance of the display device can be enhanced compared to a related art display device.

Moreover, the reflection reduction member is formed on the outer substrate, and thus, a reflectivity of external light by the metal line (which is formed on the outer substrate) is reduced, thereby enhancing visual characteristic which is shown in the display panel.

Moreover, the electricity removing layer is formed on the outer substrate along with the reflection reduction member, and thus reduces a reflectivity of external light and removes static electricity applied from the outside. Accordingly, visual characteristic which is shown in the display panel can be enhanced, and a quality of an image can be prevented from being degraded due to an inflow of static electricity.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device including a display panel, comprising:
   an outer substrate including a plurality of gate lines and a plurality of data lines that intersect with the plurality of gate lines at one side;
   an inner substrate coupled to a bottom of the outer substrate; and
   a reflection reduction member formed on another side of the outer substrate to overlap at least (i) the plurality of gate lines, (ii) the plurality of data lines or (iii) the plurality of gate lines and the plurality of data lines, the reflection reduction member configured to reduce reflection of external light by at least (i) the plurality of gate lines, (ii) the plurality of data lines or (iii) the plurality of gate lines and the plurality of data lines; and
   an edge sealing member at an entire side of the display panel and covering each side of the outer substrate and coming into contact with the reflection reduction member to form a static electricity path for conducting static electricity from the reflection reduction member,
   wherein the edge sealing member includes a conductive member to form the static electricity path, and a light blocking material to prevent a side light leakage by total internal reflection of the inner substrate, and
   wherein the edge sealing member covers each side of the inner substrate, an entire upper edge and an entire side of the reflection reduction member.

2. The display device of claim 1, wherein the reflection reduction member comprises a non-reflective conductive pattern formed on a top of the outer substrate, and configured to overlap at least (i) the plurality of gate lines, (ii) the plurality of data lines or (iii) the plurality of gate lines and the plurality of data lines.

3. The display device of claim 2, wherein the non-reflective conductive pattern is formed in a stacked structure including a three layer which include a first metal layer, an oxide layer and a second metal layer or in a stacked structure including a three layer which include a first oxide layer, a metal layer and a second oxide layer.

4. The display device of claim 3, wherein the oxide layer is formed of Zn, In, or Sn-based oxide.

5. The display device of claim 3, wherein the metal layer is formed of one metal material selected from Cu, Mo, Ti, Mo/Ti, and Cr.

6. The display device of claim 3, wherein the reflection reduction member further comprises a protective layer formed on the top of the outer substrate to cover the non-reflective conductive pattern.

7. The display device of claim 6, wherein,
   the protective layer is formed of a single layer formed of SiNx, or
   the protective layer is formed of a multilayer that includes an insulating layer formed of SiNx and a conductive layer formed of conductive oxide.

8. The display device of claim 2, further comprising an electricity removing layer formed on the top of the outer substrate to cover the reflection reduction member, the electricity removing layer coming into contact with the edge sealing member.

9. The display device of claim 8, wherein,
   the electricity removing layer is formed of one material selected from a transparent metal oxide material, a transparent organic conductive material, and indium gallium zinc oxide (IGZO), or
   the electricity removing layer is formed of a multilayer including a transparent conductive layer and a protective layer.

10. The display device of claim 1, further comprising:
    an outer cover that surrounds each side of the display panel and coming into contact with the edge sealing member to discharge the static electricity from the reflection reduction member.

11. The display device of claim 10, further comprising an electricity removing layer formed on the top of the outer substrate to cover the reflection reduction member, the electricity removing layer coming into contact with the edge sealing member,
    wherein the edge sealing member electrically connects the outer cover to at least one selected from the reflection reduction member and the electricity removing layer.

12. The display device of claim 11, wherein the edge sealing member covers an upper edge of the electricity removing layer.

13. The display device of claim 10, further comprising:
    an electricity removing layer formed on the top of the outer substrate to cover the reflection reduction member, the electricity removing layer coming into contact with the edge sealing member; and
    a conductive strap configured to electrically connect the outer cover to at least one selected from the reflection reduction member and the electricity removing layer, wherein one side of the conductive strap is covered by the edge sealing member, and the other side of the conductive strap is electrically connected to an inner surface of the outer cover through the edge sealing member.

14. The display device of claim 1, further comprising a transparent conductive layer covering the reflection reduction member, the transparent conductive layer having at least an edge contacting the edge sealing member.

15. The display device of claim 2, wherein the non-reflective conductive pattern has black or a chromatic color.

16. The display device of claim 15, wherein the non-reflective conductive pattern is formed in a two-layer structure including a metal layer and an oxide layer, and has blue color.

17. The display device of claim 16, wherein the metal layer is formed of Mo/Ti, and the oxide layer is formed of indium tin oxide (ITO).

18. The display device of claim 15, wherein the non-reflective conductive pattern is formed in a three-layer including a first metal layer, an oxide layer and a second metal layer, and has the black color.

19. The display device of claim 18, wherein the first metal layer is formed of Cu, the oxide layer is formed of indium tin oxide (ITO), and the second metal layer is formed of Mo/Ti.

* * * * *